W. H. BRESSEL & R. O'HARA.
OIL CUP.
APPLICATION FILED AUG. 15, 1911.
1,027,522.
Patented May 28, 1912.
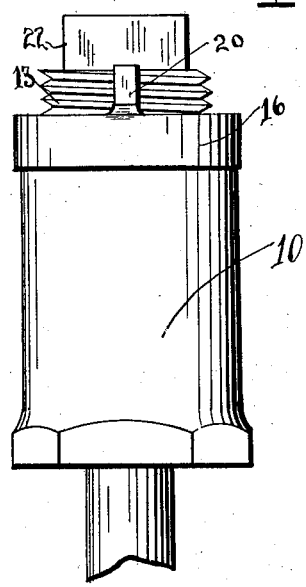
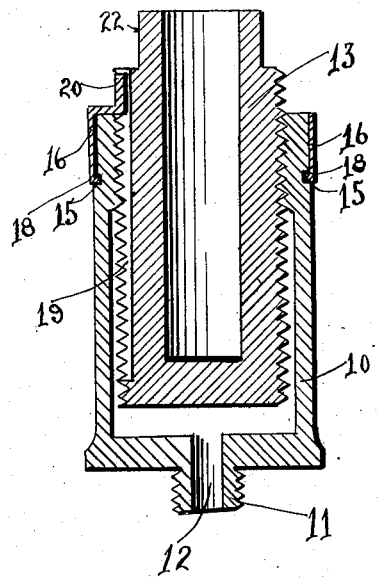
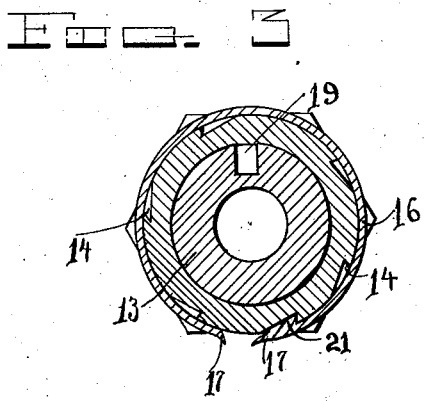
Witnesses
L. Pacovon
Harry M. Test
Inventors
Wm. H. Bressel,
Rob't. O'Hara.
By Harry Ellis Chandlee
Attorneys

UNITED STATES PATENT OFFICE.

WILLIAM H. BRESSEL AND ROBERT O'HARA, OF POCATELLO, IDAHO.

OIL-CUP.

1,027,522.  Specification of Letters Patent.  Patented May 28, 1912.

Application filed August 15, 1911.  Serial No. 644,181.

*To all whom it may concern:*

Be it known that we, WILLIAM H. BRESSEL and ROBERT O'HARA, citizens of the United States, residing at Pocatello, in the county of Bannock and State of Idaho, have invented certain new and useful Improvements in Oil-Cups, of which the following is a specification.

This invention relates to improvements in oil cups, and has particular reference to oil cups, which are used on moving parts of machinery.

The principal object of the invention is to provide a simple and efficient means for retaining the feed plug or screw within the cup, and prevent the loss of same due to jarring of the machinery. These and other objects will appear as the description proceeds.

In the drawings: Figure 1 represents a portion of a connecting rod showing our cup applied thereto. Fig. 2 is a vertical section through the oil cup. Fig. 3 is a horizontal section on the line 3—3 of Fig. 1.

Referring to the accompanying drawings, 10 represents the oil cup which is provided with a threaded nipple 11 for engagement in the usual threaded opening of the portion of the machine to be lubricated, an opening 12 leading from the interior of the cup through said nipple. A screw-threaded plug 13 is adapted to be secured into the cup to force the lubricant through the opening 12, at the upper edge of the cup is formed a series of ratchet teeth 14, and below said teeth an annular groove 15. A spring steel ring 16 which is open at one side and has its ends flared slightly outward as at 17 so that said ring may be easily spread is disposed over the space in which are formed the ratchet teeth. The ring is formed with an angular bead 18 near its lower edge, which when the ring is in position, will engage in the groove 15 of the cup, and prevent disengagement thereof. The plug 13 has cut longitudinally therein a groove 19, which is adapted to receive the inwardly and upwardly directed lug 20 on the upper edge of the ring 16, at a point diametrically opposite to the opening thereof. One of the ends 17 is slightly thickened, and formed with an angular shoulder 21 for engagement with the ratchet teeth on the cup.

Assuming the parts assembled as represented in Fig. 1, when desired to force the screw plug into the cup to apply pressure to the oil said plug is turned by any suitable tool as a wrench which can be engaged with the angular portion 22 formed upon the upper end thereof. Rotative movement of the plug causes the advancing movement into the cup, and as the lug 20 is engaged in the groove 19, the ring 16 will be carried around therewith, the shoulder 21 engaging successively with the ratchet teeth 14 and preventing a retrograde movement of the plug. The bead 18 engaging in the groove 15 insures that the ring will not become displaced or detached from the cup.

It will be observed that the groove 19 terminates at a point a suitable distance from the lower end of the plug, thus making it impossible for the plug to be jarred out of the cup when in its uppermost position, for the reason that the lug 20 will engage against the bottom of the groove, and hold the same from both rotative and vertical movement.

What is claimed is:

1. An oil cup including a screw plug for engagement therein, said plug having a longitudinal groove extending to within a distance of the inner end thereof, a resilient member on the cup, means on the resilient member for engagement in the groove, means on the resilient member for engagement with means on the cup to prevent the backward rotation of the resilient member, and a means on the resilient member for engagement with means on the cup to prevent longitudinal movement of the resilient member on the cup.

2. In an oil feeding device, a combination with an oil cup having an annular groove, ratchet teeth arranged adjacent the groove, and a screw plug for engagement in the cup having a longitudinal groove formed therein, of a spring ring engaged over said ratchet teeth, a lug on the ring for engagement in the groove of the plug, a bead on the ring for engagement in the groove of the cup, and a shoulder on said ring for engagement with said ratchet teeth, whereby said ring is prevented moving backwardly in the cup, or longitudinally therefrom.

In testimony whereof we affix our signatures, in presence of two witnesses.

WILLIAM H. BRESSEL.
ROBERT O'HARA.

Witnesses:
C. W. GRAY,
A. H. MARTIN.